(12) United States Patent
Jin et al.

(10) Patent No.: US 11,905,202 B2
(45) Date of Patent: Feb. 20, 2024

(54) METHOD OF MODIFYING A TEXTURED GLASS SUBSTRATE WITH A REGION UNDER COMPRESSIVE STRESS TO INCREASE STRENGTH OF THE GLASS SUBSTRATE

(71) Applicant: Corning Incorporated, Corning, NY (US)

(72) Inventors: Yuhui Jin, Painted Post, NY (US); Taylor Marie Wilkinson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 247 days.

(21) Appl. No.: 16/875,207

(22) Filed: May 15, 2020

(65) Prior Publication Data

US 2020/0361812 A1 Nov. 19, 2020

Related U.S. Application Data

(60) Provisional application No. 62/849,536, filed on May 17, 2019.

(51) Int. Cl.
*C03C 15/02* (2006.01)
*C03C 21/00* (2006.01)

(52) U.S. Cl.
CPC ............ *C03C 15/02* (2013.01); *C03C 21/002* (2013.01)

(58) Field of Classification Search
CPC .... C03C 15/02; C03C 21/002; C03C 2204/08
See application file for complete search history.

(56) References Cited

U.S. PATENT DOCUMENTS 3,880,630 A * 4/1975 Izawa ..................... C03C 21/00
65/400
3,900,249 A * 8/1975 Tsunashima ......... G02B 5/0294
359/707

(Continued)

FOREIGN PATENT DOCUMENTS

CN 111741935 A 10/2020
DE 3123908 A1 * 6/1981 ............. C03C 15/00

(Continued)

OTHER PUBLICATIONS

Buy Hydrofluoric acid 5% available from the wayback machine https://www.laballey.com/products/hydrofluoric-acid-5-by-weight (Year: 2020).*

(Continued)

*Primary Examiner* — Jodi C Franklin
(74) *Attorney, Agent, or Firm* — William J. Tucker

(57) ABSTRACT

A method of modifying a glass substrate comprises: generating surface features with peaks and valleys on a first surface of a glass substrate, the surface features providing a roughness average (Ra) within the range of 10 nm to 2000 nm; generating a region of the glass substrate that is under compressive stress, the region extending from the first surface to a depth of compression; and removing a portion of the region under compressive stress from the first surface into the depth of compression to define a new first surface still having surface features with peaks and valleys providing a roughness average (Ra) within the range of 10 nm to 2000 nm. Removing the portion of the region under compressive stress from the first surface into the depth of the compression to define a new first surface can comprise contacting the first surface with a light etchant.

20 Claims, 9 Drawing Sheets

(56) References Cited

U.S. PATENT DOCUMENTS

| | | | | |
|---|---|---|---|---|
| 4,017,291 | A | * | 4/1977 | Gliemeroth ............. C03C 21/00 65/30.14 |
| 4,597,988 | A | * | 7/1986 | Kukanskis .............. C23C 18/22 427/307 |
| 5,127,930 | A | * | 7/1992 | Howorth ................. H01J 29/86 65/32.4 |
| 5,598,496 | A | * | 1/1997 | Anderson ............ G02B 6/3869 385/84 |
| 5,804,317 | A | * | 9/1998 | Charrue .................. C03C 21/00 65/30.14 |
| 6,134,918 | A | * | 10/2000 | Eto ....................... C03C 21/002 65/30.14 |
| 8,778,496 | B2 | | 7/2014 | Hart |
| 8,889,254 | B2 | | 11/2014 | Bayne et al. |
| 9,140,543 | B1 | | 9/2015 | Allan et al. |
| 9,884,784 | B2 | | 2/2018 | Kashima et al. |
| 10,040,718 | B2 | * | 8/2018 | Hou ........................ C09K 13/08 |
| 11,204,114 | B2 | * | 12/2021 | Leger ..................... F16L 21/08 |
| 2008/0213626 | A1 | * | 9/2008 | Kobayashi ........... G11B 5/8404 428/800 |
| 2010/0167059 | A1 | * | 7/2010 | Hashimoto ........... C03C 21/002 428/428 |
| 2010/0246016 | A1 | * | 9/2010 | Carlson .................... C09G 1/00 359/599 |
| 2012/0090673 | A1 | * | 4/2012 | Dimitrov .......... H01L 31/02168 257/E31.13 |
| 2012/0134025 | A1 | * | 5/2012 | Hart ........................ C03C 19/00 428/141 |
| 2012/0329525 | A1 | * | 12/2012 | Hashimoto ........... C03C 21/002 361/679.01 |
| 2013/0169591 | A1 | * | 7/2013 | Hung ..................... C03C 21/00 428/156 |
| 2013/0288001 | A1 | * | 10/2013 | Murata .................... C03C 3/087 501/63 |
| 2013/0323468 | A1 | * | 12/2013 | Myers .................. C03C 17/009 428/143 |
| 2014/0170380 | A1 | * | 6/2014 | Murata .................... C03C 3/087 428/141 |
| 2014/0356604 | A1 | * | 12/2014 | Borrelli ................. C03C 23/007 65/30.13 |
| 2015/0175478 | A1 | * | 6/2015 | Ravichandran ......... C03C 15/00 428/141 |
| 2015/0210588 | A1 | | 7/2015 | Chang et al. |
| 2015/0299034 | A1 | | 10/2015 | Hou et al. |
| 2016/0002103 | A1 | | 1/2016 | Wang et al. |
| 2016/0118512 | A1 | * | 4/2016 | Tsugeno ............ H01L 31/02363 438/71 |
| 2016/0208387 | A1 | * | 7/2016 | Liu ......................... C23C 18/40 |
| 2016/0244358 | A1 | * | 8/2016 | Isogai .................... C03C 15/00 |
| 2017/0036941 | A1 | * | 2/2017 | Lee ........................ C03C 15/00 |
| 2017/0103249 | A1 | * | 4/2017 | Jin ........................... H05K 3/22 |
| 2017/0144923 | A1 | * | 5/2017 | Jin ......................... C03C 15/00 |
| 2018/0086662 | A1 | * | 3/2018 | Luzzato ................. C03C 15/00 |
| 2018/0215647 | A1 | * | 8/2018 | Ortner ................. C03B 33/0222 |
| 2018/0215651 | A1 | | 8/2018 | Akiba et al. |
| 2018/0257978 | A1 | * | 9/2018 | Minamidate ............ B32B 27/14 |
| 2018/0313977 | A1 | * | 11/2018 | Newton ................ G02B 5/1861 |
| 2019/0107751 | A1 | | 4/2019 | Bazemore et al. |
| 2019/0219532 | A1 | * | 7/2019 | Kashkoush ............ G01N 27/07 |
| 2019/0248702 | A1 | * | 8/2019 | Lee ........................... B24B 1/00 |
| 2019/0325192 | A1 | * | 10/2019 | Zhan ..................... G06V 40/12 |
| 2020/0199020 | A1 | | 6/2020 | Hatano et al. |
| 2021/0188698 | A1 | | 6/2021 | Hu et al. |
| 2021/0265127 | A1 | * | 8/2021 | Borland ................. H01J 35/064 |
| 2021/0291172 | A1 | * | 9/2021 | Fang ....................... C03C 3/093 |

FOREIGN PATENT DOCUMENTS

| | | | | |
|---|---|---|---|---|
| WO | WO-2016040151 | A1 | * | 3/2016 ............. C03C 15/00 |
| WO | 2019/049958 | A1 | | 3/2019 |

OTHER PUBLICATIONS

International Search Report and Written Opinion of the International Searching Authority; PCT/US2020/032773; dated Sep. 22, 2020; 9 Pages; European Patent Office.

Chinese Patent Application No. 202080036697.1, Office Action, dated Mar. 8, 2023, 5 pages Chinese Patent Office.

* cited by examiner

METHOD OF MODIFYING A TEXTURED GLASS SUBSTRATE WITH A REGION UNDER COMPRESSIVE STRESS TO INCREASE STRENGTH OF THE GLASS SUBSTRATE

CLAIM OF PRIORITY

This application claims the benefit of priority under 35 U.S.C. § 119 of U.S. Provisional Application No. 62/849,536, filed on May 17, 2019, the content of which is incorporated herein by reference in its entirety.

BACKGROUND

The present invention generally relates to a method of modifying a glass substrate to improve strength, and more particularly to a glass substrate that has been textured to impart surface features and tempered to impart one or more regions of compressive stress.

Consumer electronics and other devices often incorporate a glass substrate to cover display screens, which often have touch screen capabilities. In some instances, it is desirable for the glass substrate to minimize glare from ambient light and to improve the tactile experience when the glass substrate is utilized as a touch-screen surface. In some instances, it is desirable for the glass substrate to maximize mechanical strength, which resists fracturing of the glass substrate when the glass substrate is impacted. The glass substrate can minimize glare after the surface of the glass substrate is modified, in a process referred to as "texturing," to have surface features that alter the reflection of light. In addition, the glass substrate can maximize mechanical strength after the glass substrate is modified, in a process referred to as "tempering," to have region(s) contiguous with the primary surface(s) that are under compressive stress.

However, there is a problem in that glass substrates that have been both textured and tempered have less mechanical strength than glass substrates that have been tempered but not textured. In other words, texturing a tempered glass substrate typically reduces the mechanical strength imparted to the glass substrate via the tempering process.

SUMMARY

The present disclosure solves that problem by modifying a glass substrate that has been both textured to impart surface features and tempered to impart region(s) of compressive stress to remove between 0.5 µm to 2 µm of the thickness of the textured region(s) under compressive stress. A light etchant, such as diluted hydrofluoric acid, or a base, such as sodium hydroxide can be utilized to remove between 0.5 µm to 2 µm of the thickness of the textured region(s) under compressive stress. Removing a thickness within that range does not significantly alter the glare reducing property (haze) imparted during the texturing process.

According to a first aspect of the present disclosure, a method of modifying a glass substrate comprises: with a glass substrate having a region under compressive stress from a first surface to a depth of compression, and the first surface having surface features with peaks and valleys, removing a portion of the region under compressive stress from the first surface into the depth of compression to define a new first surface still having surface features with peaks and valleys providing a roughness average (Ra) within the range of 10 nm to 2000 nm. In an embodiment, the depth of the compression (DOC) under compressive stress, before a portion thereof is removed, is at least 20 µm into the glass substrate from the first surface. In an embodiment, the region under compressive stress has a maximum compressive stress of at least 200 MPa. In an embodiment, the portion of the region under compressive stress that is removed has a thickness within the range of 0.5 µm to 2 µm. In an embodiment, removing the portion of the region under compressive stress from the first surface into the depth of compression to define a new first surface comprises contacting the first surface with a light etchant. In an embodiment, the light etchant includes hydrofluoric acid, or an alkali hydroxide. In an embodiment, the light etchant is a liquid with a weight percentage of hydrofluoric acid within the range of 1 wt % to 5 wt %. In an embodiment, the light etchant contacts the glass substrate for a time period within the range of 30 seconds to 5 minutes. In an embodiment, the glass substrate has a second surface at least approximately parallel to the first surface, and a thickness between the first surface and the second surface, the thickness being less than 1 mm.

According to a second aspect of the present disclosure, a method of modifying a glass substrate comprises: generating surface features with peaks and valleys on a first surface of a glass substrate, the surface features providing a roughness average (Ra) within the range of 10 nm to 2000 nm; generating a region of the glass substrate that is under compressive stress, the region extending from the first surface to a depth of compression; and removing a portion of the region under compressive stress from the first surface into the depth of compression to define a new first surface still having surface features with peaks and valleys providing a roughness average (Ra) within the range of 10 nm to 2000 nm. In an embodiment, generating surface features with peaks and valleys on a first surface of a glass substrate includes contacting the glass substrate with a texturing etchant. In an embodiment, the texturing etchant includes: (a) hydrofluoric acid; (b) a salt having either an ammonium cation or an alkali cation; and (c) an organic solvent. In an embodiment, the salt includes one or more of ammonium fluoride, ammonium bifluoride, potassium fluoride, potassium bifluoride, sodium fluoride, sodium bifluoride, and potassium chloride. In an embodiment, the organic solvent includes one or more of an alcohol, a glycol, and glycerol. In an embodiment, the glass substrate has a second surface at least approximately parallel to the first surface, and a thickness between the first surface and the second surface, the thickness being less than 1.0 mm. In an embodiment, generating the region of the glass substrate that is under compressive stress includes subjecting the glass substrate to an ion-exchange chemical tempering process. In an embodiment, the depth of the compression (DOC) under compressive stress, before a portion thereof is removed, is at least 20 µm into the glass substrate from the first surface. In an embodiment, the portion of the region under compressive stress that is removed has a thickness within the range of 0.5 µm to 2 µm. In an embodiment, the ion-exchange chemical tempering process includes placing the glass substrate into an alkali nitrate molten salt bath comprising potassium nitrate and sodium nitrate having a combined concentration in a range of 88 wt % to 100 wt %, the molten salt bath having a temperature within a range of 350° C. to 500° C. In an embodiment, removing the portion of the region under compressive stress from the first surface into the depth of the compression to define a new first surface comprises contacting the first surface with a light etchant. In an embodiment, the light etchant is a liquid with a weight percentage of hydrofluoric acid within the range of 1 wt % to 5 wt %.

In an embodiment, the light etchant contacts the glass substrate for a time period within the range of 30 seconds to 5 minutes. In an embodiment, the method further comprises, after generating surface features and before generating the region of the glass substrate that is under compressive stress, smoothing the surface features by contacting the glass substrate with a polishing etchant.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
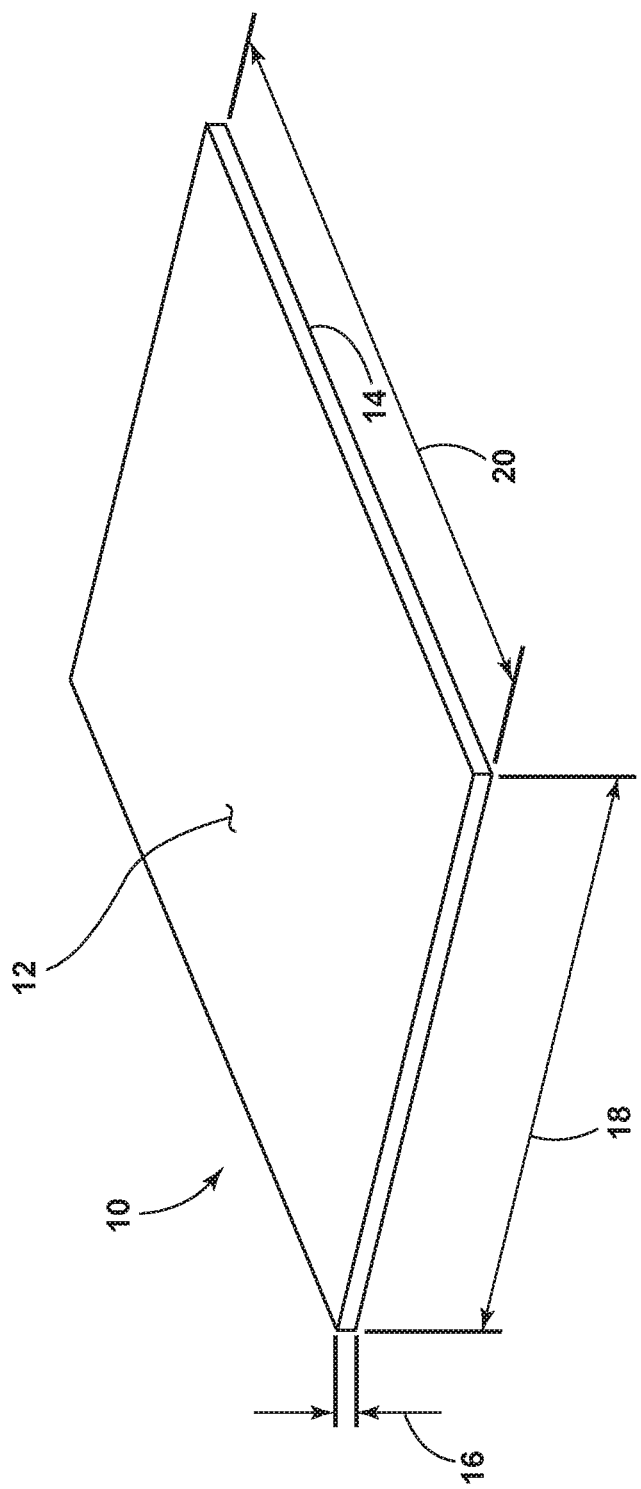
FIG. 1 is a perspective view of a glass substrate, illustrating a first surface parallel to a second surface with a thickness between them.

Reference will now be made in detail to the present preferred embodiments, examples of which are illustrated in the accompanying drawings. Whenever possible, the same reference numerals will be used throughout the drawings to refer to the same or like parts.

Figure 2:
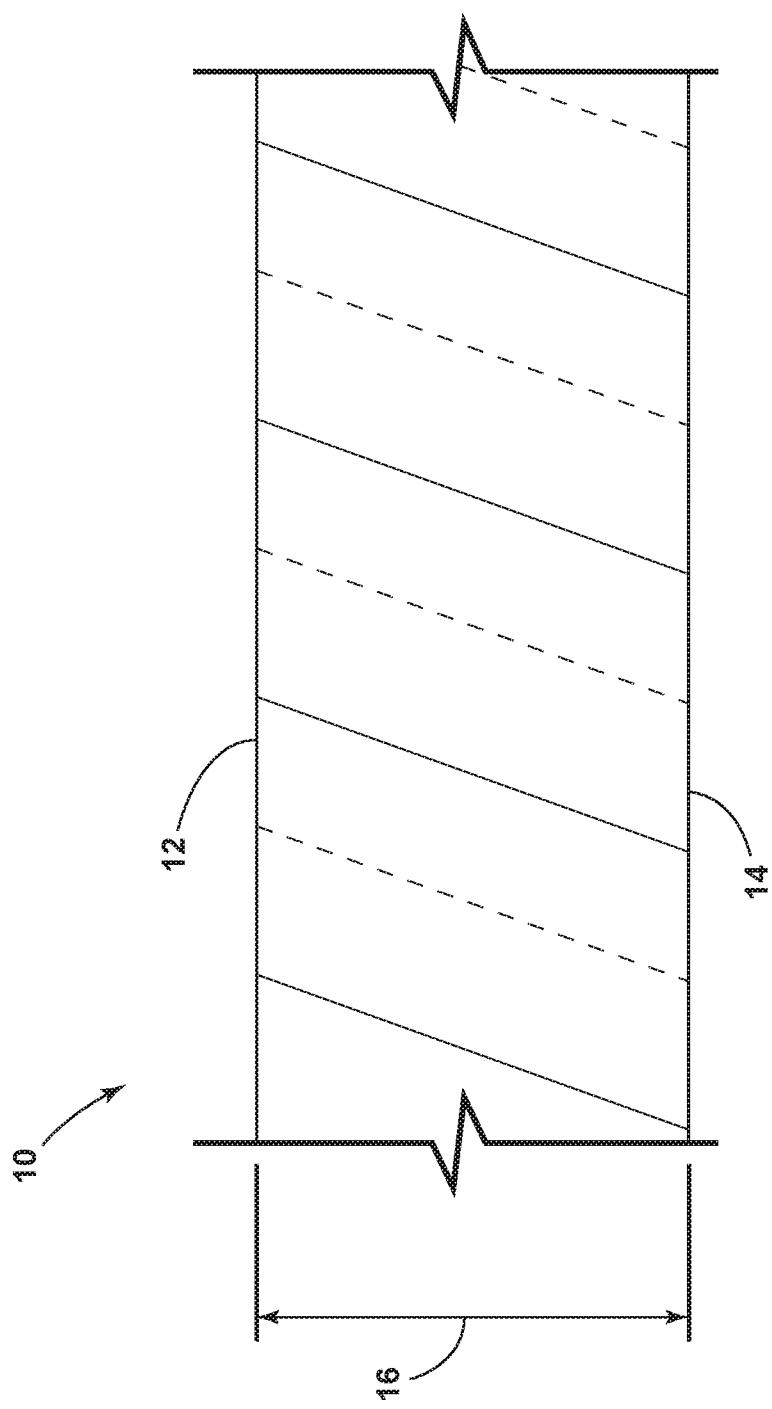
FIG. 2 is an elevational view of the glass substrate of FIG. 1, illustrating the thickness separating the first surface and the second surface.

Referring now to FIGS. 1 and 2, a glass substrate 10 includes a first surface 12 and a second surface 14, which are the primary surfaces of the glass substrate 10. In the illustrated embodiment, the second surface 14 is at least approximately parallel to the first surface 12, but the second surface 14 need not be at least approximately parallel to the first surface 12. The glass substrate 10 has a thickness 16, defined as the shortest straight-line distance between the first surface 12 and the second surface 14. The thickness 16 can be any thickness that is suitable for the particular application of the glass substrate 10. In an embodiment, the thickness 16 is 3.0 mm or less, such as between 0.1 mm and 3.0 mm, such as between 0.5 mm and 1.5 mm, and such as 1.25 mm or less, and less than 1.0 mm. In an embodiment, the first surface 12 and the second surface 14 are at least approximately planar, parallel, and rectangularly shaped, so as to define a width 18 and a length 20 of the glass substrate 10.

The glass substrate 10 can have any composition suitable for the application of the glass substrate 10. The glass substrate 10 can be an aluminosilicate glass, a borosilicate glass, or a silicate glass. In some embodiments, the glass substrate 10 is capable of undergoing an ion-exchange chemical tempering process, and, as such, can be an alkali aluminosilicate glass, an alkali borosilicate glass, or an alkali silicate glass (alkaline earth versions are also possible). In some embodiments, the glass substrate 10 has a composition that comprises or consists essentially of: from about 62 mol % to about 70 mol % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. In some embodiments, the glass substrate 10 has a composition that comprises or consists essentially of: from about 64 mol % to about 69 mol % $SiO_2$; from about 5 mol % to about 12 mol % $Al_2O_3$; from about 8 mol % to about 23 mol % $B_2O_3$; from about 0.5 mol % to about 2.5 mol % MgO; from about 1 mol % to about 9 mol % CaO; from about 0 mol % to about 5 mol % SrO; from about 0 mol % to about 5 mol % BaO; from about 0.1 mol % to about 0.4 mol % $SnO_2$; from about 0 mol % to about 0.1 mol % $ZrO_2$; and from about 0 mol % to about 1 mol % $Na_2O$. The glass substrate 10 can be down drawable—i.e., formed by methods such as slot draw or fusion draw processes.

Figure 3:
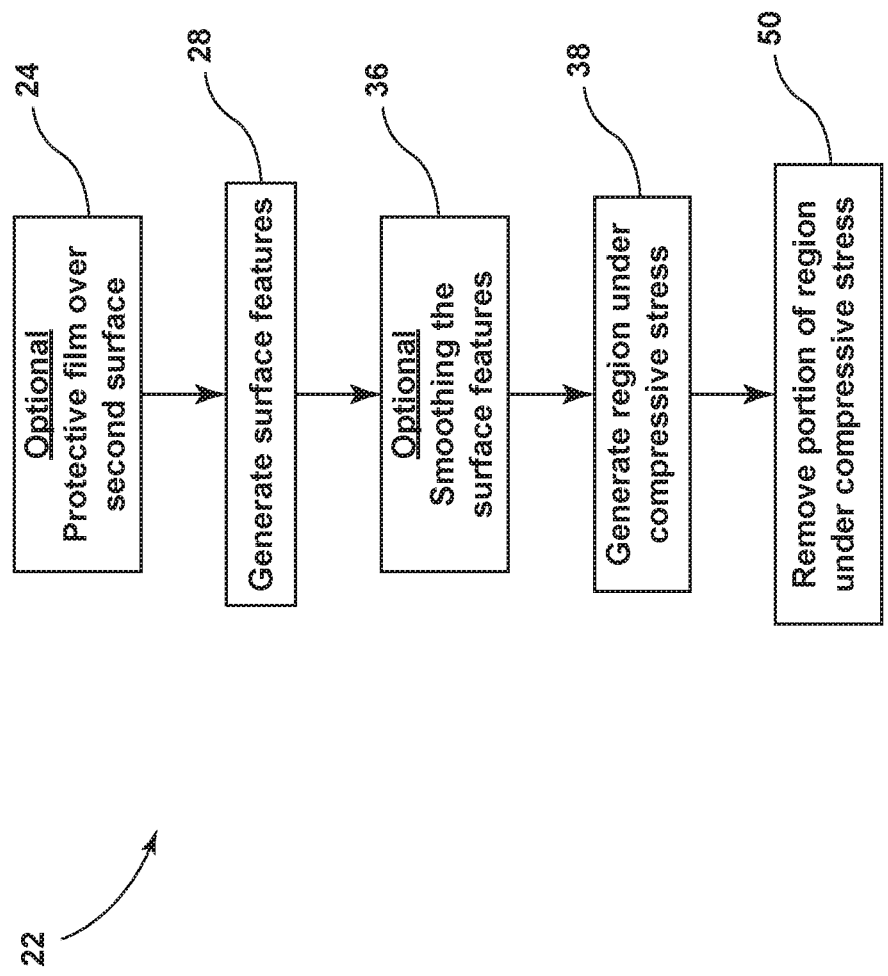
FIG. 3 is a flow diagram of a method of modifying the glass substrate of FIG. 1, to improve the mechanical strength thereof.

Referring now to FIG. 3, a method 22 of modifying the glass substrate 10 is illustrated. In an optional step 24, the method 22 includes placing a protective barrier 26 (such as a film or coating) over one of the surfaces of the glass substrate 10, such as the second surface 14. The protective barrier 26 preserves the state of the protected second surface 14 during additional steps of the method 22 described herein. The protective barrier 26 can be a plastic film and can be acid-resistant. An example of such a protective barrier 26 is the adhesive polymer film ANT-200 (from Seil Hi-Tec, South Korea).

Figure 4:
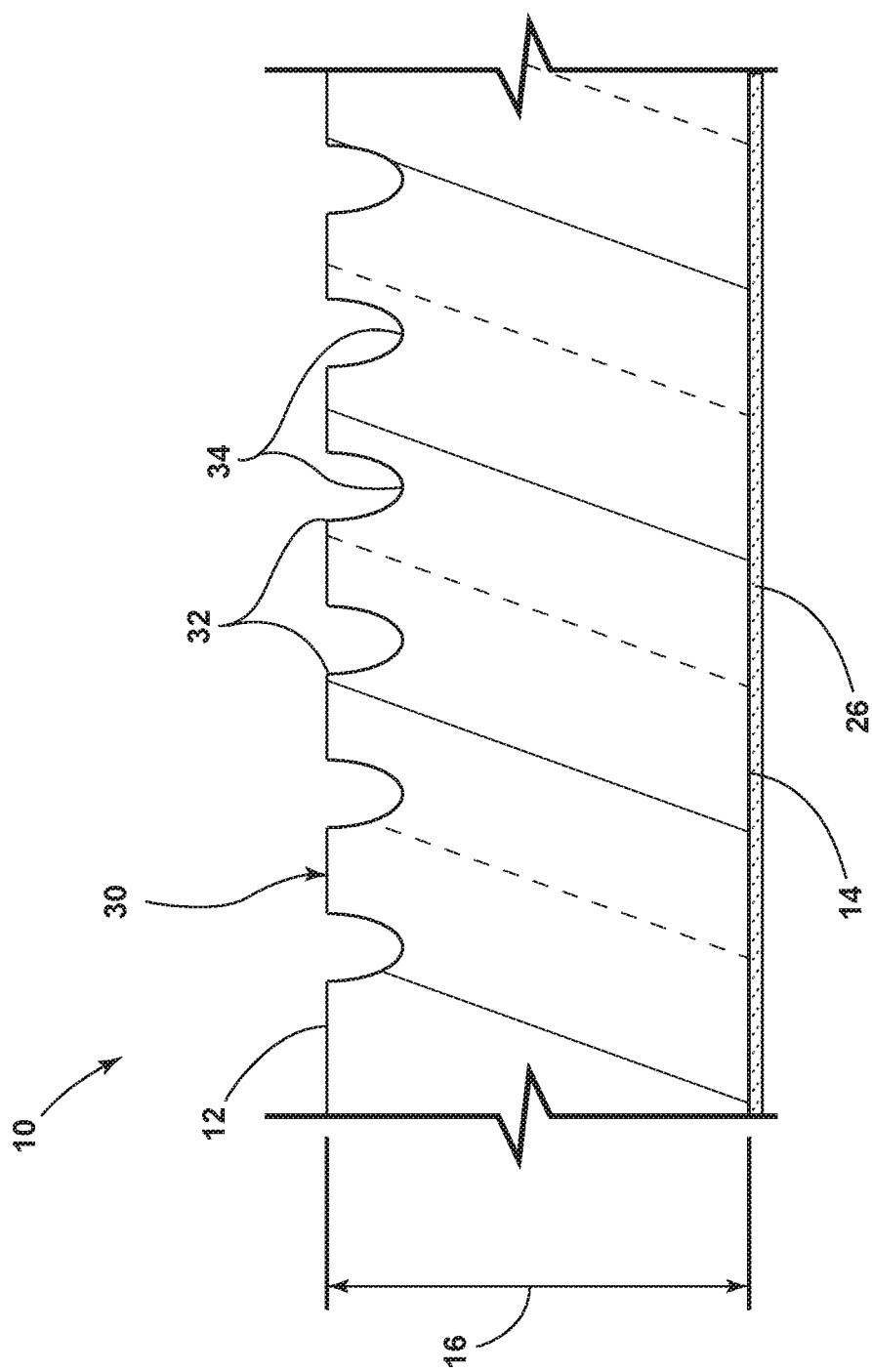
FIG. 4 is an elevational view of the glass substrate of FIG. 1 after undergoing a step of the method of FIG. 3, illustrating surface features on the first surface and a protective barrier over the second surface.

Referring now additionally to FIG. 4, at step 28, the method 22 further includes generating surface features 30 with peaks 32 and valleys 34 on the first surface 12 (the non-protected surface) of the glass substrate 10. This step 28 of generating surface features 30 is, as mentioned, sometimes referred to as "texturing." The surface features 30 can diffuse (scatter) reflected light and thus be generated to impart the glass substrate 10 with anti-glare properties. The generation of the surface features 30 changes the texture or feel of the first surface 12 of the glass substrate 10, which can be desirable for a glass substrate 10 used in touch screen applications. There are various ways to quantify the level of "texturing," such as measuring horizontal distances between adjacent peaks 32 and vertical distances between a peak 32 and an adjacent valley 34. One such quantification is the roughness average (Ra), which is the arithmetical mean of the absolute values of the vertical deviations from the horizontal mean line of the peaks 32 and the valleys 34. In embodiments, after the generation of the surface features 30, the roughness average (Ra) of the first surface 12 is within the range of 10 nm to 2000 nm.

In an embodiment of the method 22, contacting the glass substrate 10 with a texturing etchant generates the surface features 30 on the first surface 12 of the glass substrate 10. For example, the glass substrate 10 can be selectively partially or completely dipped in, submersed in, or sprayed with, a liquid ("wet") texturing etchant comprising: (a) hydrofluoric acid; (b) a salt having either an ammonium cation or an alkali cation; and (c) an organic solvent. The hydrofluoric acid reacts with the first surface 12 of the glass substrate 10 thus creating byproducts, which in turn react with the salt to form crystals on the first surface 12 of the glass substrate 10. The hydrofluoric acid continues to preferentially etch around the crystals creating the surface features 30. The organic solvent further acts as a wetting agent between the first surface 12 of the glass substrate 10 and the salt. Examples of the salt include one or more of ammonium fluoride, ammonium bifluoride, potassium fluoride, potassium bifluoride, sodium fluoride, sodium bifluoride, and potassium chloride. Examples of the organic solvent include one or more of an alcohol, a glycol, and glycerol. After a sufficient time has passed to produce the desired roughness average (Ra) (or whatever other quantification is utilized), the glass substrate 10 is removed from contacting the texturing etchant, rinsed with water (preferably deionized water), and dried. In addition to the wet chemical etching technique just described, and other wet chemical etching techniques, other techniques such as grinding, thermal roughening, sand blasting, laser ablation, reactive-ion-etching, plasma etching, and like roughening methods, or combinations thereof, can be selected to generate the surface features 30.

Figure 5:
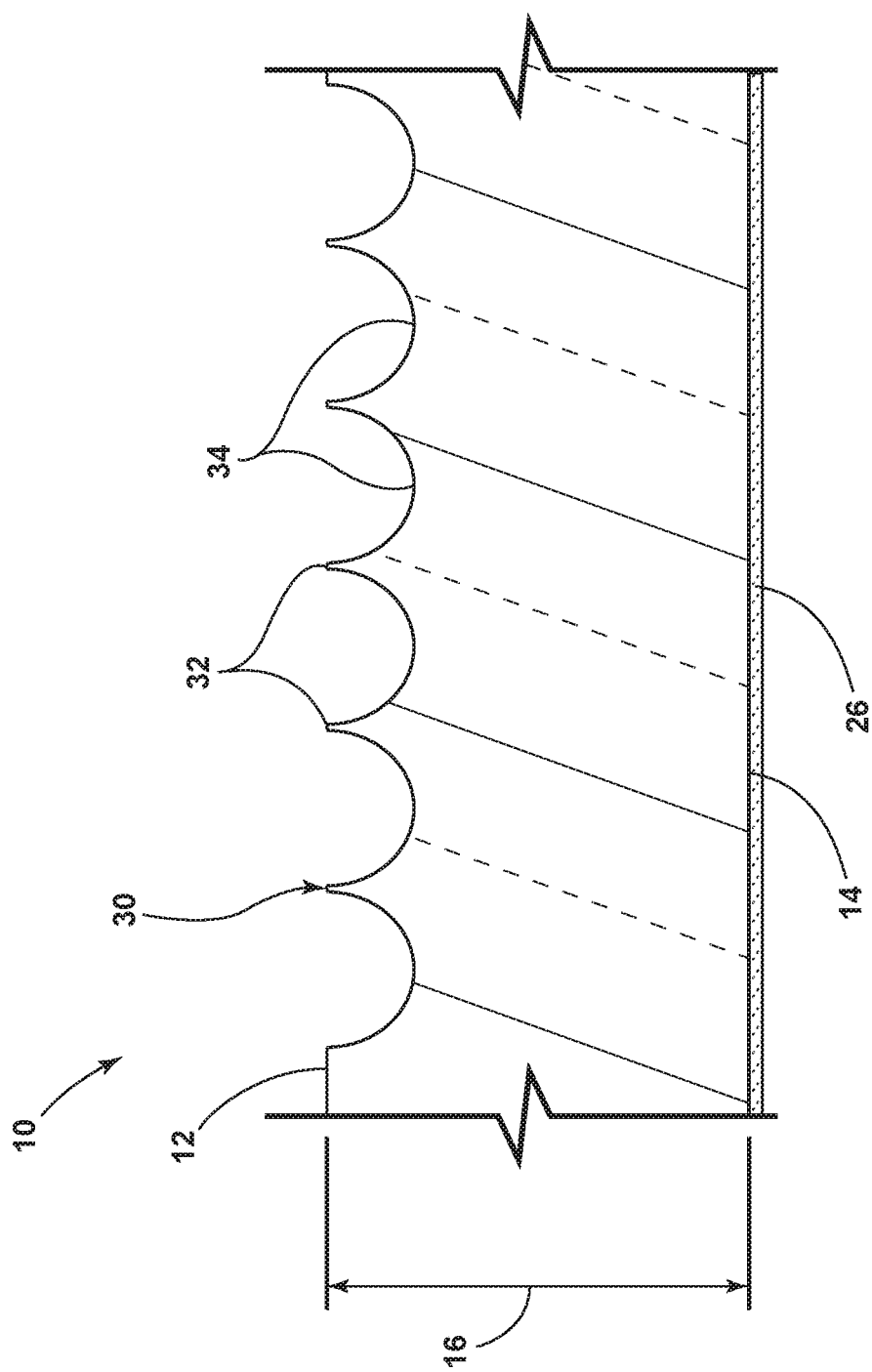
FIG. 5 is an elevational view of the glass substrate of FIG. 4 after undergoing another step of the method of FIG. 3, illustrating the surface features on the first surface having been smoothed such that valleys of the surface features are wider relative to peaks of the surface features than in FIG. 4.

Referring now additionally to FIG. 5, the method 22 optionally further includes, at step 36, smoothing the surface features 30 generated at the first surface 12. After the step 36 above that generates the surface features 30, the surface features 30 can have peaks 32 that are taller than desired relative to the width of the valleys 34. Surface features 30 having such geometry can concentrate stress during deformation of the glass substrate 10, such as bending. Smoothing the surface features 30 widens the valleys 34 of the surface features 30 and narrows the distance between adjacent surface features 30, but without drastically lowering the heights of the peaks 32 (thus not drastically altering the roughness average (Ra) of the surface features 30). The smoothing of the surface features 30 decreases the aforementioned concentration of stress during deformation of the glass substrate 10. The act of smoothing the surface features 30 can be referred to as "polishing." In an embodiment, to smooth the surface features 30, the glass substrate 10 is contacted with a polishing etchant, such as submersing the glass substrate 10 in a liquid polishing etchant. Example polishing etchants include an acid such as hydrofluoric acid, or a base such as an alkali hydroxide (e.g., sodium hydroxide, potassium hydroxide, etc.). For example, if the polishing etchant is an alkali hydroxide such as sodium hydroxide, potassium hydroxide etc. or a mixture of these chemicals then these chemicals could be used in an etching process where the chemicals have a concentration from 5 wt % to 50 wt %, an etch temperature from 90° C. to 140° C., and an etch time from 10 minutes to 120 minutes. Mineral acids such as sulfuric acid and nitric acid can be added to hydrofluoric acid, if hydrofluoric acid is used. In embodiments, after the smoothing of the surface features 30, the roughness average (Ra) of the first surface 12 is still within the range of 10 nm to 2000 nm. In an embodiment, the polishing etchant is a liquid with a weight percentage of hydrofluoric acid within the range of 1 wt % to 5 wt %, and the polishing etchant contacts the glass substrate 10 for a time period within the range of 30 seconds to 5 minutes. In an embodiment, the polishing etchant is a liquid including one or more alkali hydroxides, and the light etchant contacts the glass substrate 10 for a time period within the range of 2 minutes to 1 hour. After contact with the polishing etchant, the glass substrate 10 is rinsed with water, preferably deionized water.

Figure 6:
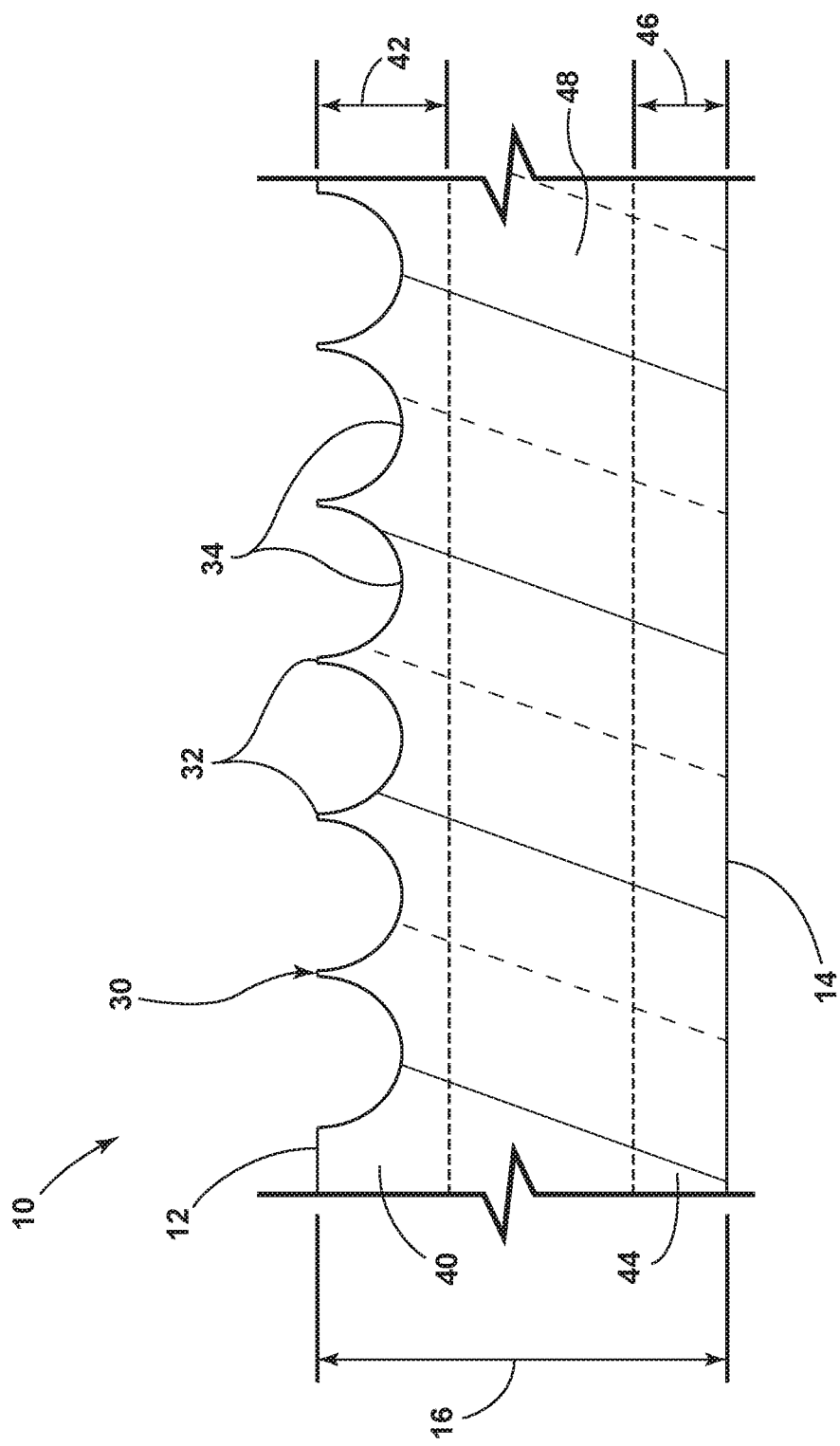
FIG. 6 is an elevational view of the glass substrate of FIG. 5 without the protective barrier over the second surface and after undergoing another step of the method of FIG. 3, illustrating regions of compressive stress contiguous with the first surface and the second surface.

Referring now additionally to FIG. 6, the method 22 further includes, at step 38, generating a region 40 of the glass substrate 10, contiguous with the first surface 12, that is under compressive stress ("CS"). The region 40 extends from the first surface 12 to a depth of compression 42. The step 38 can also generate a second region 44 of the glass substrate 10, contiguous with the second surface 14, that is under compressive stress. The second region 44 extends from the second surface 14 to a second depth of compression 46. This generation of compressive stress at the region 40 and the second region 44 further creates a central region 48 that is under a tensile stress, having a maximum value at the center of the central region 48, referred to as central tension or center tension (CT). The central region 48 extends from the depth of compression 42 to the second depth of compression 46, and is under tensile stress. The tensile stress of the central region 48 balances or counteracts the compressive stresses of the region 40 and the second region 44. As used herein, the terms "depth of compression" and "DOC" refer to the depth at which the stress within the glass substrate 10 changes from compressive to tensile stress. At the depth of compression 42, the stress crosses from a positive (compressive) stress to a negative (tensile) stress and thus has a value of zero. The depths of compression 42, 46 protect the glass substrate 10 from the propagation of flaws introduced by sharp impact to the first and/or second surfaces 12, 14 of the glass substrate 10, while the compressive stress CS minimizes the likelihood of a flaw growing and penetrating through the depths of compression 42, 46 of the regions 40, 44 respectively. In embodiments, the depths of compression 42, 46 are each at least 20 μm into the glass substrate 10 from the first surface 12, and from the second surface 14 respectively.

Two methods for extracting detailed and precise stress profiles (stress as a function of depth) for a glass substrate 10 with regions 40, 44 under compressive stress are disclosed in U.S. Pat. No. 9,140,543, entitled "Systems and Methods for Measuring the Stress Profile of Ion-Exchanged Glass," filed by Douglas Clippinger Allan et al. on May 3, 2012, and claiming priority to U.S. Provisional Patent Application No. 61/489,800, having the same title, and filed on May 25, 2011, the contents of which are incorporated herein by reference in their entirety.

In embodiments, the absolute value of the maximum compressive stress CS within the regions is at least 200 MPa, up to about 400 MPa, or up to about 1000 MPa. In some embodiments, the maximum compressive stress CS is located at the surfaces 12, 14. In other embodiments, however, the maximum compressive stress CS may be located in the compressive stress regions 40, 44 at some depth below the surfaces 12, 14 of the glass substrate 10.

The "depth of layer" ("DOL"), not to be confused with the depth of compression, is the depth of the regions 40, 44 under compressive stress as determined by surface stress meter (FSM) measurements using commercially available instruments such as the FSM-6000 (Luceo Co., Ltd., Tokyo, Japan). Methods of measuring compressive stress at the surfaces 12, 14 and depth of layer are described in ASTM 1422C-99, entitled "Standard Specification for Chemically Strengthened Flat Glass," and ASTM 1279.19779 "Standard Test Method for Non-Destructive Photoelastic Measurement of Edge and Surface Stresses in Annealed, Heat-Strengthened, and Fully-Tempered Flat Glass," the contents of which are incorporated herein by reference in their entirety. In embodiments, the measured depths of layer are at least 5 µm.

In embodiments, the step 38 of generating the region 40 of the glass substrate 10 that is under compressive stress includes subjecting the glass substrate 10 to an ion-exchange chemical tempering process (chemical tempering is often referred to as "chemical strengthening"). In the ion-exchange chemical tempering process, ions at or near the first and second surfaces 12, 14 of the glass substrate 10 are replaced by—or exchanged with—larger ions usually having the same valence or oxidation state. In those embodiments in which the glass substrate 10 comprises, consists essentially of, or consists of an alkali aluminosilicate glass, an alkali borosilicate glass, or an alkali silicate glass, ions in the surface layer of the glass and the larger ions are monovalent alkali metal cations, such as $Na^+$ (when $Li^+$ is present in the glass), $K^+$, $Rb^+$, and $Cs^+$. Alternatively, monovalent cations in, at, or near the surfaces 12, 14 may be replaced with monovalent cations other than alkali metal cations, such as $Ag^+$ or the like.

In embodiments, the ion-exchange process is carried out by immersing the glass substrate 10 in a molten salt bath containing the larger ions to be exchanged with the smaller ions in the glass substrate 10. It will be appreciated by those skilled in the art that parameters for the ion-exchange process, including, but not limited to, bath composition and temperature, immersion time, the number of immersions of the glass in a salt bath (or baths), use of multiple salt baths, and additional steps such as annealing, washing and the like, are generally determined by the composition of the glass substrate 10 and the desired depths of layer and compressive stress of the glass substrate 10 that result from the strengthening operation. By way of example, ion-exchange of alkali metal-containing glass substrates may be achieved by immersion in at least one molten bath containing a salt such as, but not limited to, nitrates, sulfates, and chlorides of the larger alkali metal ion. In embodiments, the molten salt bath is an alkali nitrate molten salt bath comprising potassium nitrate and sodium nitrate having a combined concentration in a range of 88 wt % to 100 wt %. In embodiments, the molten salt bath comprises potassium nitrate (0-100 wt %), sodium nitrate (0-100 wt %), and lithium nitrate (0-12 wt %), the combined potassium nitrate and sodium nitrate having a weight percentage within the range of 88 wt % to 100 wt %. In embodiments, the temperature of the molten salt bath typically is in a range from about 350° C. up to about 500° C., while immersion times range from about 15 minutes up to about 40 hours, including from about 20 minutes to about 10 hours. However, temperatures and immersion times different from those described above may also be used.

Figure 7:
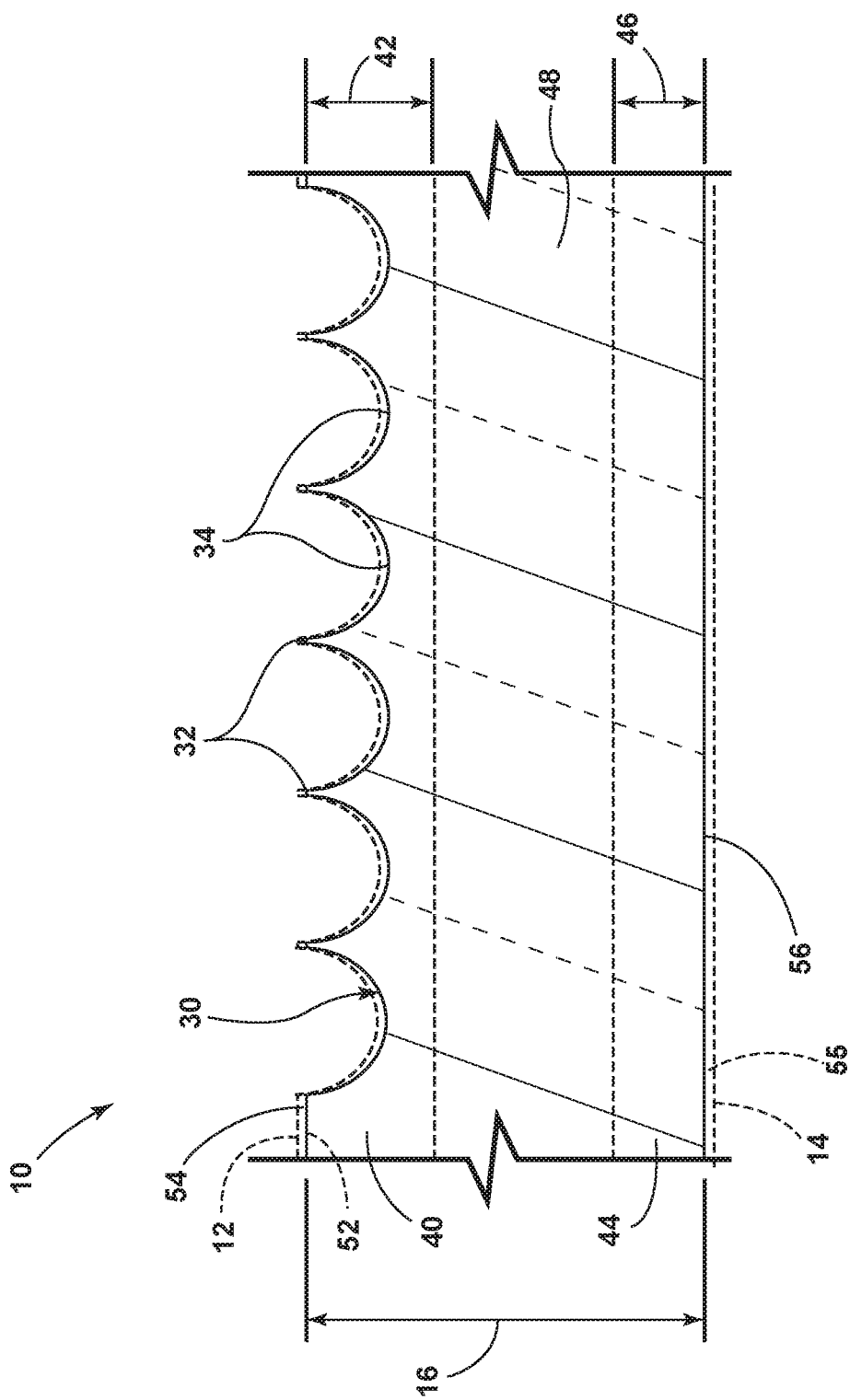
FIG. 7 is an elevational view of the glass substrate of FIG. 6 after undergoing another step of the method of FIG. 3, illustrating removed portions of the regions of compressive stress to define a new first surface and a new second surface.

Referring now additionally to FIG. 7, the method 22, at step 50, further includes removing a portion 52 of the region 40 under compressive stress from the first surface 12 into the depth of compression 42 to define a new first surface 54. The new first surface 54 still has surface features 30 with peaks 32 and valleys 34, and a roughness average (Ra) within the range of 10 nm to 2000 nm. The portion 52 of the region 40 under compressive stress that is removed has a thickness within the range of 0.5 µm to 2 µm. In other words, the step 50 reduces the depth of compression 42 by 0.5 µm to 2 µm. The generation of the region 40 of compressive stress in step 38 can generate randomly distributed defects exposed at the first surface 12 and extending a small distance into the region 40 of compressive stress. The defects reduce the mechanical strength of the glass substrate 10, such as the monotonic equibiaxial flexural strength of the glass substrate 10. A limited removal of the region 40 under compressive stress on the order of 0.5 µm to 2 µm (such as less than 1 µm) reduces the number of randomly distributed defects produced during the generation of the region 40 of compressive stress and, thereby, the mechanical strength of the glass substrate 10 improves. However, the limited removal maintains the vast majority of the depth of compression 42 and thereby preserves the fracture resistance that the region 40 of compressive stress provides. In addition, the limited removal maintains the surface features 30 generated in step 28, such that the surface features 30 still provide a roughness average (Ra) within the range of 10 nm to 2000 nm, as mentioned above. In embodiments, a portion 55 of the region 44 under compressive stress from the second surface 14 into the depth of compression 46 is additionally removed to define a new second surface 56. The portions 52, 55 removed having a depth within the range of 0.5 µm to 2 µm provides the proper balance between (1) being of sufficient depth to remove the defects introduced at the first surface 12 via the tempering of step 38 and (2) being of insufficient depth to substantially alter (a) the light scattering (i.e., glare reducing) characteristics (haze) of the surface features 30 imparted during the texturing of step 28 and (b) the strengthening at the depths of compression 42, 46 imparted during the tempering of step 38.

In embodiments, the step 50 of removing the portion 52 of the region 40 under compressive stress includes contacting the first surface 12 with a light etchant. Like the polishing etchant described above, examples of the light etchant include an acid such as hydrofluoric acid, or a base such as an alkali hydroxide (e.g., sodium hydroxide, potassium hydroxide, etc.). For example, if the light etchant is an alkali hydroxide such as sodium hydroxide, potassium hydroxide etc. or a mixture of these chemicals then these chemicals could be used in an etching process where the chemicals have a concentration from 5 wt % to 50 wt %, an etch temperature from 90° C. to 140° C., and an etch time from 10 minutes to 120 minutes. Mineral acids such as sulfuric acid and nitric acid can be added to hydrofluoric acid, if hydrofluoric acid is used. In an embodiment, the light etchant is a liquid with a weight percentage of hydrofluoric acid within the range of 1 wt % to 5 wt %, and the light etchant contacts the glass substrate 10 for a time period within the range of 30 seconds to 5 minutes. In an embodiment, the light etchant is a liquid including one or more alkali hydroxides, and the light etchant contacts the glass substrate 10 for a time period within the range of 2 minutes to 1 hour. After contact with the light etchant, the glass substrate 10 is rinsed with water, preferably deionized water. Contacting the first surface 12 with a light etchant is preferable over light mechanical polishing of the first surface 12 because current methods of mechanical polishing would significantly alter the surface features 30 and optical performance (such as haze) of the textured glass substrate 10. In addition, some ion-exchange processes can cause water to enter into the first surface 12 of the glass substrate 10 resulting in the glass substrate 10 having a profile of hydrogen into a depth of the glass substrate 10. The light etchant removes or at least partially removes the hydrogen profile from the glass substrate 10 without significantly altering the surface features 30, whereas mechanical polishing cannot remove the hydrogen profile without significantly altering or destroying the surface features 30.

After the completion of the method 22 of modifying the glass substrate 10, the glass substrate 10 has desired optical properties, such as a desired haze value, provided by the surface features 30 of the first surface 12. As used herein, the term "haze" refers to the percentage of transmitted light scattered outside an angular cone of ±4.0° in accordance with ASTM procedure D1003, the contents of which are incorporated herein by reference in their entirety. For an optically smooth surface, transmission haze is generally close to zero. In an embodiment, the glass substrate 10 has a haze within the range of 1% to 100%. In an embodiment, the glass substrate 10 has a haze of less than about 50%. In an embodiment, the glass substrate 10 has a haze of less than about 30%.

Example

Samples of a glass substrate 10 were prepared. Each sample of the glass substrate 10 had a length of 50 mm, a width of 50 mm, and a thickness of 0.8 mm.

Chemical Tempering.

All of the samples of the glass substrate 10 were subjected to an ion-exchange chemical tempering process in order to generate the regions 40, 44 under compressive stress as in step 38 of the method 22. In particular, before the ion-exchange process, any protective barrier 26 over the second surface 14 was removed. Then, the second surface 14 was cleaned, for a time period of 12 minutes, in a 2% concentration KOH detergent solution, supplied by Semiclean KG, having a temperature of 70° C. The samples of the glass substrate 10 were then placed in a molten salt bath of 86.2 wt % $KNO_3$, 11.8 wt % $NaNO_3$, and 2 wt % $LiNO_3$ for a time period of 8.4 hours. The molten salt bath had a temperature of 450° C.

Control Samples.

To prepare the control samples of the glass substrate 10, pursuant to step 24 of the method 22, a protective barrier 26 of a plastic film was placed over the second surface 14 of each sample of the glass substrate 10. These samples are hereinafter referred to as the "Control Samples." The Control Samples were then chemically tempered, pursuant to step 38 of the method 22, as described above. Twenty-four (24) Control Samples were prepared.

Textured Samples.

In addition to step 24 of the method 22 to place a protective barrier 26 over the second surface 14, a portion of the samples of the glass substrate 10 was further processed pursuant to the step 28 of the method 22 to generate the surface features 30. In particular, these samples of the glass substrate 10 were contacted with a liquid texturing etchant comprising 6 wt % hydrofluoric acid, 20 wt % ammonium fluoride, 15 wt % propylene glycol, with balance water. The glass substrates 10 so contacted the texturing etchant for a time period of 8 minutes and at room temperature (~72° F.). These samples of the glass substrate 10 were then rinsed with deionized water. These samples are hereinafter referred to as the "Textured Samples." The Textured Samples were then chemically tempered, pursuant to step 38 of the method 22, as described above. Twenty-five (25) Textured Samples were prepared.

Textured and Light Etched Samples.

After the steps 24, 28, 38 of placing a protective barrier 26 over the second surface 14, generating the surface features 30 on the first surface 12, and chemically tempering the glass substrate 10, a portion of the samples of the glass substrate 10 was further processed pursuant to the step 50 to remove the portion 52 of the region 40 under compressive stress from the first surface 12 into the depth of compression 42 to define the new first surface 54. In particular, these samples of the glass substrate 10 were contacted with a liquid light etchant comprising 2.5 wt % hydrofluoric acid in a balance of water. These samples of the glass substrate 10 so contacted the light etchant for a time period of 1 minute and at room temperature (~72° F.). These samples of the glass substrate 10 were then rinsed with deionized water. These samples are hereinafter referred to as the "Textured and Light Etched Samples." Twenty-three (23) Textured and Light Etched Samples were prepared.

Textured, Polished, and Light Etched Samples.

After the steps 24, 28 of placing a protective barrier 26 over the second surface 14, and generating the surface features 30 on the first surface 12, a portion of the samples of the glass substrate 10 was processed pursuant to the step 36 of the method 22 to smooth the generated surface features 30. In particular, these samples of the glass substrate 10 were contacted with a liquid polishing etchant comprising 2.5 wt % hydrofluoric acid in a balance of water. These samples so contacted the polishing etchant for a time period of 2 minutes and at room temperature (~72° F.). These samples of the glass substrate 10 were then rinsed with deionized water. The samples were then chemically tempered, pursuant to step 38 of the method 22, as described above. The samples were then further processed pursuant to the step 50 to remove the portion 52 of the region 40 under compressive stress from the first surface 12 into the depth of compression 42 to define the new first surface 54. In particular, these samples of the glass substrate 10 were contacted with a liquid light etchant comprising 2.5 wt % hydrofluoric acid in a balance of water. The samples so contacted the light etchant for a time period of 1 minute and at room temperature (~72° F.). The light etching removed 0.7 µm of the first surface 12 to define the new first surface 54. These samples of the glass substrate 10 were then rinsed with deionized water. These samples are hereinafter referred to as the "Textured, Polished, and Light Etched Samples." Twenty-four (24) Textured, Polished, and Light Etched Samples were prepared.

Monotonic Equibiaxial Flexural Strength.

Figure 8:
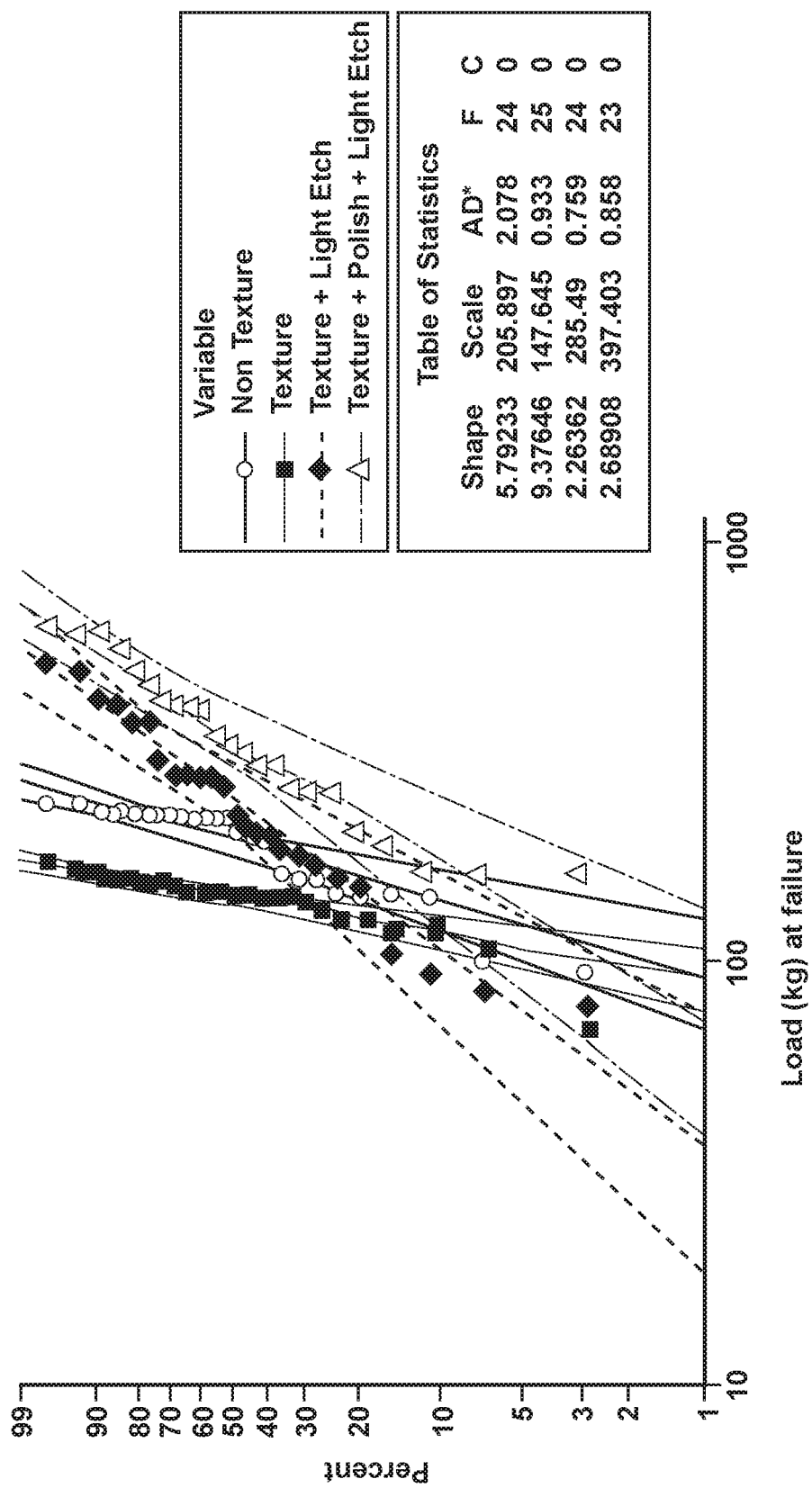
FIG. 8 is a Weibull probability graph showing the likelihood of fracture of the glass substrate as a function of the load on the glass substrate, illustrating that glass substrates having surface features and regions of compressive stress have improved mechanical strength when portions of the regions of compressive stress have been removed to define a new first surface.

Referring now to FIG. 8, ring-on-ring load to failure testing was performed on each of the prepared samples according to ASTM C1499. The ring-on-ring load to failure testing is one way to determine the surface strength of the first surface 12 of the glass substrate 10, and good test results are desired for glass substrates used in the devices described in the background where the glass substrate covers displays and is used in touch-screen applications. The ring-on-ring load to failure testing parameters included a contact radius of 1.6 mm, a load ring diameter of 0.5 inches, a support ring diameter of 1 inch, and a cross head speed of 1.2 mm/min. The first surface 12 was placed downward on the ring. The testing was performed with an Instron 5967 Universal Test Machine.

The Textured Samples showed the least flexural strength, followed by the Control Samples. As discussed above, the surface features 30 generated during step 28 concentrate stress during deformation of the glass substrate 10. The Control Samples did not have such surface features 30 while the Textured Samples did. The concentration of the stress during the ring-on-ring load application in the Textured Samples resulted in the Textured Samples failing more easily than the Control Samples.

The Textured and Light Etched Samples provided improved results over the Control Samples. As discussed above, the step 38 of generating the region 40 that is under compressive stress can generate randomly distributed defects exposed at the first surface 12 and extending a small distance into the region 40 of compressive stress. The step 50 of removing the portion 52 of that compressive stress region 40 via contact with the light etchant eliminates many of the defects. The Control Samples, having been subjected to the chemical tempering, includes those defects. The presence of those defects during the ring-on-ring load application in the Control Samples resulted in the Control Samples failing more easily than the Textured and Light Etched Samples.

The Textured, Polished, and Light Etched Samples provided improved results over the Textured and Light Etched Samples. As discussed above, the surface features 30 generated during the step 28 concentrate stress during deformation of the glass substrate 10. The step 36 of smoothing the surface features 30 via contact with the polishing etchant reduces the stress concentration. Reducing the stress concentration resulted in the Textured, Polished, and Light Etched Samples failing less easily than the Textured and Light Etched Samples.

The step 50 of removing the portion 52 of that compressive stress region 40 via contact with the light etchant significantly improved the strength of the samples with the surface features 30, as shown with the Textured and Light Etched Samples and the Textured, Polished, and Light Etched Samples compared with the Textured Samples. The Textured and Light Etched Samples and the Textured, Polished, and Light Etched Samples even outperformed the Control Samples. Without being bound by theory, it is believed now that the presence of the defects imparted during the chemical tempering more detrimentally affects surface strength than the concentration of stresses during flexure imparted during the generation of the surface features 30 (texturing).

Figure 9:
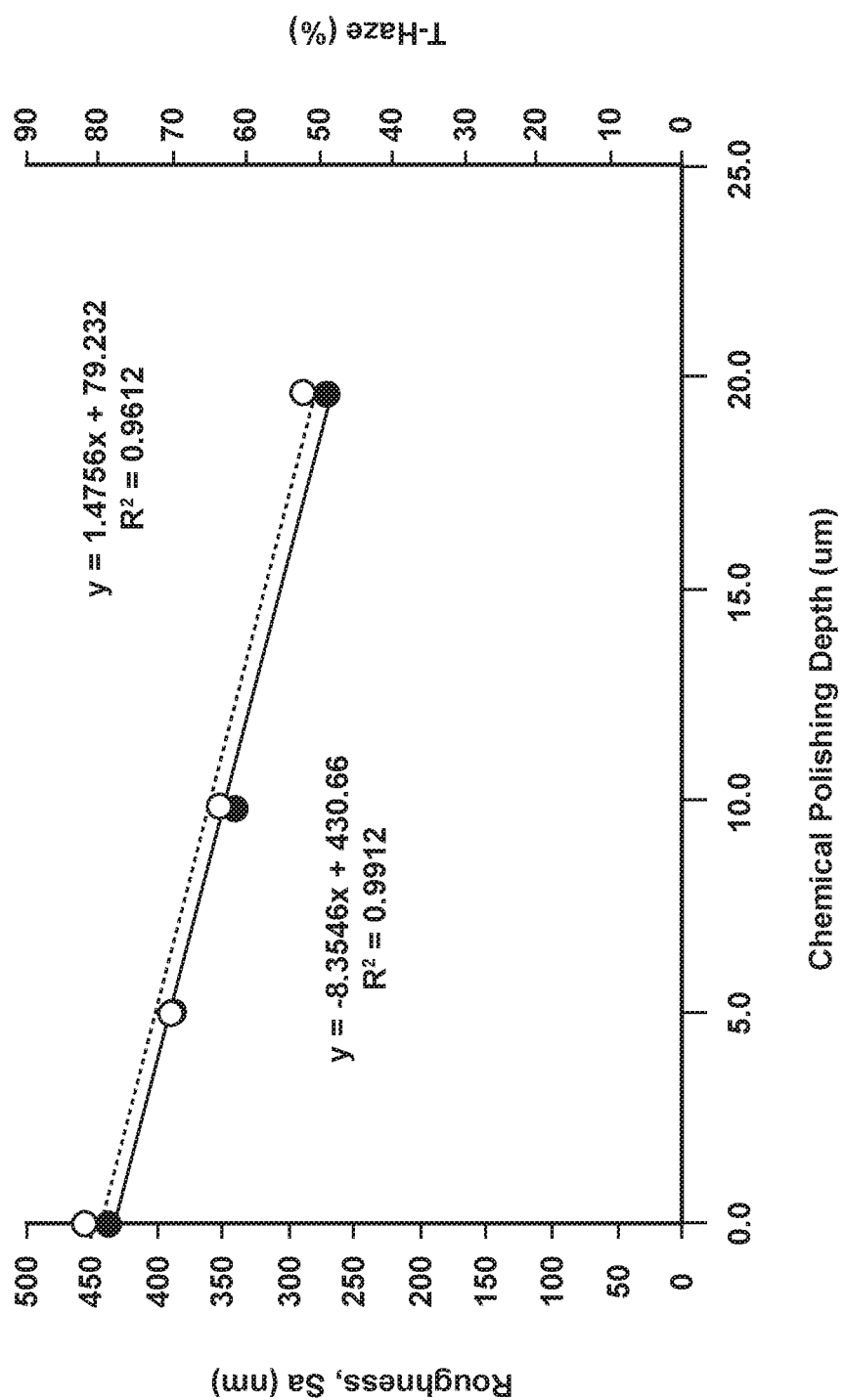
FIG. 9 is a graph showing the arithmetic mean height of the surface features, and percent haze, as a function of the depth of the portions of the regions of compressive stress that have been removed to define a new first surface, illustrating that minor removals of the region of compressive stress (e.g., less than 2 μm) cause an inconsequential reduction in arithmetic mean height and haze.

Effect of Removing Less than 2 μm of the Depth of Compression. Referring now to FIG. 9, the arithmetic mean height of the surface features 30 (Sa, a three dimensional surface roughness parameter) of the first surface 12 and the haze (percent) provided by the first surface 12 are tabulated as a function of the removed portion 52 of the depth of compression 42 pursuant to step 50. As illustrated, removing a depth of less than 2 μm would have only a minor impact on the haze and surface roughness of the first surface 12.

It should be appreciated that in the embodiments disclosed herein where the glass substrate could be replaced with other types of substrates such as, for example, a glass ceramic or a ceramic.

It will be apparent to those skilled in the art that various modifications and variations can be made without departing from the spirit or scope of the claims.

What is claimed is:

1. A method of modifying a glass substrate comprising:
generating a glass substrate having a region under compressive stress from a first surface to a depth of compression (DOC), wherein the first surface has surface features with peaks and valleys, the surface features providing a roughness average (Ra) within the range of 10 nm to 2000 nm; and
removing a portion of the region under compressive stress from the first surface into the depth of compression to define a new first surface still having surface features with peaks and valleys providing a roughness average (Ra) within the range of 10 nm to 2000 nm,
wherein, the removing the portion of the region under compressive stress from the first surface into the depth of compression to define the new first surface comprises contacting the first surface with a light etchant that is a liquid comprising hydrofluoric acid within a range of 1 wt % to 5 wt % or sodium hydroxide within a range of 5 wt % to 50 wt %,
wherein, the removing the portion of the region under compressive stress is conducted such that the portion has a thickness within the range of 0.5 μm to 2 μm,
wherein, the contacting is conducted for 30 seconds to 5 minutes with the hydrofluoric acid or at a temperature from 90° C. to 140° C. for 2 minutes to 120 minutes with the sodium hydroxide,
wherein, a change in an arithmetic mean height (Sa) of the surface features measured before and after the removing step is less than 5%, and
further wherein, a change in a haze provided by the first surface measured before, and the new first surface measured after, the removing step is less than 5%.

2. The method of claim 1,
wherein, the depth of compression (DOC), before the step of removing a portion of the region under compressive stress, is at least 20 μm into the glass substrate from the first surface.

3. The method of claim 1,
wherein, the region under compressive stress has a maximum compressive stress of at least 200 MPa.

4. The method of claim 1,
wherein, the glass substrate has a second surface at least approximately parallel to the first surface, and a thickness between the first surface and the second surface, the thickness being less than 1 mm.

5. The method of claim 1,
wherein, the step of removing a portion of the region under compressive stress is conducted such that the portion has a thickness within the range of 0.7 μm to 2 μm.

6. The method of claim 1, wherein the removing the portion of the region under compressive stress is conducted such that the portion has a thickness within the range of 0.5 μm to 1 μm, and further wherein a change in a haze and in an arithmetic mean (Sa) provided by the first surface measured before, and the new first surface measured after, the removing step is less than 2%.

7. The method of claim 6, wherein the glass substrate exhibits a characteristic strength (Weibull scale factor) of at least 280 MPa after the generating and removing steps.

8. A method of modifying a glass substrate comprising:
generating surface features with peaks and valleys on a first surface of a glass substrate, the surface features providing a roughness average (Ra) within the range of 10 nm to 2000 nm;
after the generating surface features, smoothing the surface features by contacting the glass substrate with a polishing etchant such that the valleys are widened;
after the smoothing the surface features, generating a region of the glass substrate that is under compressive stress, the region extending from the first surface to a depth of compression (DOC); and
removing a portion of the region of the glass substrate that is under compressive stress from the first surface into the depth of compression to define a new first surface still having surface features with peaks and valleys providing a roughness average (Ra) within the range of 10 nm to 2000 nm,
wherein, the removing the portion of the region of the glass substrate that is under compressive stress from the first surface into the depth of compression to define the new first surface comprises contacting the first surface with a light etchant that is a liquid comprising sodium hydroxide within a range of 5 wt % to 50 wt %,
wherein, the removing the portion of the region of the glass substrate that is under compressive stress is conducted such that the portion has a thickness within the range of 0.5 μm to 2 μm, and
further wherein the contacting the first surface with a light etchant is conducted at a temperature from 90° C. to 140° C. for 2 minutes to 120 minutes.

9. The method of claim 8,
wherein, generating surface features with peaks and valleys on a first surface of a glass substrate includes contacting the glass substrate with a texturing etchant.

10. The method of claim 9,
wherein, the texturing etchant includes: (a) hydrofluoric acid; (b) a salt having either an ammonium cation or an alkali cation; and (c) an organic solvent.

11. The method of claim 10,
wherein, the salt includes one or more of ammonium fluoride, ammonium bifluoride, potassium fluoride, potassium bifluoride, sodium fluoride, sodium bifluoride, and potassium chloride; and
wherein, the organic solvent includes one or more of an alcohol, a glycol, and glycerol.

12. The method of claim 8,
wherein, the glass substrate has a second surface at least approximately parallel to the first surface, and a thickness between the first surface and the second surface, the thickness being less than 1.0 mm.

13. The method of claim 8,
wherein, generating the region of the glass substrate that is under compressive stress includes subjecting the glass substrate to an ion-exchange chemical tempering process.

14. The method of claim 13,
wherein, the ion-exchange chemical tempering process includes placing the glass substrate into an alkali nitrate molten salt bath comprising potassium nitrate and sodium nitrate having a combined concentration in a range of 88 wt % to 100 wt %, the molten salt bath having a temperature within a range of 350° C. to 500° C.

15. The method of claim 8,
wherein, the depth of compression (DOC), before the step of removing a portion of the region of the glass substrate that is under compressive stress, is at least 20 μm into the glass substrate from the first surface.

16. The method of claim 8,
wherein, the step of removing a portion of the region of the glass substrate that is under compressive stress is conducted such that the portion has a thickness within the range of 0.7 μm to 2 μm.

17. The method of claim 8,
wherein, the polishing etchant comprises one or more alkali hydroxides at a concentration of 5 wt % to 50 wt %, and the smoothing of the surface features by contacting the glass substrate with the polishing etchant is conducted such that the polishing etchant contacts the glass substrate for a time period within a range of from 10 minutes to 120 minutes and at a temperature within a range of from 90° C. to 140° C.

18. The method of claim 8, wherein a change in an arithmetic mean height (Sa) of the surface features measured before and after the removing step is less than 5%, and further wherein a change in a haze provided by the first surface measured before, and the new first surface measured after, the removing step is less than 5%.

19. The method of claim 8, wherein the removing the portion of the region under compressive stress is conducted such that the portion has a thickness within the range of 0.5 μm to 1 μm, and further wherein a change in a haze and in an arithmetic mean (Sa) provided by the first surface measured before, and the new first surface measured after, the removing step is less than 2%.

20. The method of claim 19, wherein the glass substrate exhibits a characteristic strength (Weibull scale factor) of at least 390 MPa after the generating surface features, smoothing the surface features, generating a region of the glass substrate that is under compressive stress, and removing a portion of the region of the glass substrate steps.

* * * * *